US007792341B2

(12) United States Patent
Schutyser

(10) Patent No.: US 7,792,341 B2
(45) Date of Patent: Sep. 7, 2010

(54) METHOD FOR DERIVING A TREATMENT PLAN FOR ORTHOGNATIC SURGERY AND DEVICES THEREFOR

(75) Inventor: Filip Schutyser, Sint-Niklaas (BE)

(73) Assignee: Medicim N.V. (BE)

( * ) Notice: Subject to any disclaimer, the term of this patent is extended or adjusted under 35 U.S.C. 154(b) by 938 days.

(21) Appl. No.: 11/629,270

(22) PCT Filed: Jun. 27, 2005

(86) PCT No.: PCT/BE2005/000100

§ 371 (c)(1),
(2), (4) Date: Dec. 12, 2006

(87) PCT Pub. No.: WO2006/000063

PCT Pub. Date: Jan. 5, 2006

(65) Prior Publication Data

US 2007/0197902 A1    Aug. 23, 2007

(30) Foreign Application Priority Data

Jun. 25, 2004    (GB)    ................................. 0414277.4

(51) Int. Cl.
*G06K 9/00* (2006.01)
(52) U.S. Cl. ......................... 382/128; 382/154; 382/285
(58) Field of Classification Search .................. 382/128, 382/154, 285
See application file for complete search history.

(56) References Cited

U.S. PATENT DOCUMENTS

| 6,081,739 A * | 6/2000 | Lemchen ..................... 600/407 |
| 6,213,769 B1 | 4/2001 | Bettega et al. |
| 6,845,175 B2 * | 1/2005 | Kopelman et al. .......... 382/154 |
| 7,156,655 B2 * | 1/2007 | Sachdeva et al. ............. 433/24 |
| 2004/0015327 A1 | 1/2004 | Sachdeva et al. |

FOREIGN PATENT DOCUMENTS

WO    WO 03/028577 A2    4/2003

OTHER PUBLICATIONS

Troulis, M J et al., "Development of a three-dimensional treatment planning system based on computed tomographic data", International Journal of Oral and Maxilofacial Surgery, vol. 31, No. 4, Aug. 2002, pp. 349-357, XP008053607 ISSN: 0901-5027.

Sschutyser F et al., "Image-based 3D planning of maxillofacial distraction procedures including soft tissue implications", Medical Image Computing and Computer-assisted Intervention—MICCAI 2000 Third International Conference Proceedings (Lecture Notes in Computer Science vol. 1935) Springer-Verlag Berlin, Germany, 2000, pp. 999-1007, XP008053601 ISBN: 3-540-41189-5.

(Continued)

*Primary Examiner*—Tom Y Lu
(74) *Attorney, Agent, or Firm*—Reinhart Boerner Van Deuren P.C.

(57) ABSTRACT

The present invention is related to a method for performing a cephalometric or anthropometric analysis comprising the steps of: acquiring a 3D scan of a person's head using a 3D medical image modality, generating a 3D surface model using data from the 3D scan, generating from the 3D scan at least one 2D cephalogram geometrically linked to the 3D surface model, indicating anatomical landmarks on the at least one 2D cephalogram and/or on the 3D surface model, performing the analysis using the anatomical landmarks.

16 Claims, 11 Drawing Sheets

OTHER PUBLICATIONS

Verstreken K et al., "An image-guided planning system for endosseous oral implants", IEEE Transactions on Medical Imaging IEEE USA, vol. 17, No. 5, Oct. 1998, pp. 842-852, XP008053785 ISSN: 0278-0062.

* cited by examiner

METHOD FOR DERIVING A TREATMENT PLAN FOR ORTHOGNATIC SURGERY AND DEVICES THEREFOR

CROSS-REFERENCE TO RELATED PATENT APPLICATIONS

This patent application is the National Stage of International Application No. PCT/BE2005/000100 filed Jun. 27, 2005, that claims the benefit of Great Britain Application No. 0414277.4 filed Jun. 25, 2004.

FIELD OF THE INVENTION

The present invention relates to methods for assessing the shape of the skull and soft tissues and for determining a treatment plan for maxillofacial surgery and more particularly for orthognatic surgery and devices used in such surgery or in the preparation thereof.

STATE OF THE ART

In maxillofacial surgery, the skull and dentition is surgically remodelled or restored. This surgical discipline encompasses surgical interventions of repair, in particular, of a mis-positioning of the jaws with respect to one another, called orthognatic surgery. Typically, orthognatic surgery involves osteotomies of the maxilla and/or mandible to reposition these bone fragments correctly with respect to the rest of the skull and to create a good occlusion. Osteotomies are surgical operations whereby a bone is cut to shorten, lengthen or change its alignments. With 'occlusion' is meant the manner in which the teeth from upper and lower arches come together when the mouth is closed.

The preparation of such a surgical intervention requires implementing orthodontic and radiographic techniques.

Orthodontic Techniques

A casting of the patient's mandibular and maxillary dentition is made. These castings, generally made of plaster, are then mounted in an articulator representing the tempero-mandibular joints and jaw members. The castings are used to simulate the relative displacement that has to be applied to the jaws to create a good occlusion. To enable the surgeon to respect the simulated relative positions, a splint, i.e. a plate comprising on each of its surfaces tooth-prints of the two castings, is made. The splint is used to maintain the casting or the jaws in relative positions where the teeth are in occlusion.

Since the surgical intervention generally includes osteotomies of both jaws, two splints are generally made from the dental castings, in addition to a so-called initial splint linking the two jaws in their occlusion position before the intervention.

A so-called intermediary splint determines the foreseeable displacement of the maxilla with respect to the mandible, when the mandible is in its original (preoperative) position. This splint enables the surgeon to place the maxilla back on the skull in the desired definitive position before intervening on the mandible. A so-called definitive splint determines the occlusion objective to be surgically achieved and is thus used to correctly position the mandible on the skull by setting the position of the mandible with respect to the previously replaced maxilla.

Radiographic Techniques

The preparation of the surgical operation also uses X-ray radiographs of the patient. Typically a lateral radiograph (cephalogram) is performed. Sometimes a frontal X-ray radiograph and other radiography with different views are performed. These radiographs enable, in particular, performing an approximate simulation of the operative action.

The simulation is performed manually from a tracing paper placed on the radiography. For example, landmarks are indicated and the contours of the mandible are drawn. The tracing paper is then moved to approximately reproduce thereon the desired post-operative occlusion, after which the maxillary contours are drawn. The maxillo-mandibular assembly drawn on the tracing paper is then moved in one block while respecting cephalometric standards, labial ratios, as well as other criteria known for this type of intervention. The direction and amplitude of the jaw displacements are thus radiographically and approximately defined. The results of this simulation are compared and adjusted according to the relative motion of the mandible and of the maxilla envisaged by means of the splints.

The actual simulation of an orthognatic surgical intervention is thus performed essentially manually. Further, this simulation is only done in two dimensions based on a plane profile view of the skull.

The current generation of CT-scanners provide detailed 3D information of the patient's anatomy. Based on this data, 3D surface reconstructions of the bone and the skin surface are possible. Bone fragments can be isolated, and moved with respect to each other. This could provide a suitable basis for a computer assisted orthognatic surgery planning system. However, the currently available 3D surface representations algorithms do not provide a suitable framework comprising anatomically relevant references, which allow the clinician to easily and reliably reposition a bone fragment in the virtual 3D environment. A second problem is associated with the use of 3D surface representations derived from CT-scans of patients having amalgam dental fillings. Teeth amalgam fillings create artefacts that appear as streaks on the CT images. Using these CT images as such, it is impossible to plot on a three-dimensional view the exact position of the teeth to obtain the bite.

Patent document WO03/028577-A2 discloses an apparatus and method for fabricating orthognatic surgical splints. It also relates to a method for creating a computerised composite skull model suitable for diagnosis and treatment planning. In said method a 3D CT model of the patient's bone structure and a digital dental computer model of the patient's dentition are generated, both comprising a same set of fiduciary markers.

AIMS OF THE INVENTION

The present invention aims to provide a method for performing a cephalometric and/or anthropometric analysis. In a second object it aims to provide a method for deriving a treatment plan for orthognatic surgery, comprising said analysis method. In a further object it aims to provide devices suitable therefor.

SUMMARY OF THE INVENTION

The present invention relates to a method for performing a cephalometric and/or anthropometric analysis comprising the steps of:
  acquiring a 3D scan of a person's head using a 3D medical image modality,
  generating a 3D surface model using data from that 3D scan,
  generating from the 3D scan at least one 2D cephalogram geometrically linked to the 3D surface model, indicating anatomical landmarks on the at least one 2D cephalogram and/or on the 3D surface model, performing the cephalometric and/or anthropometric analysis using the anatomical landmarks.

Preferably the medical image modality is magnetic resonance imaging or computer tomography. The 3D surface model advantageously represents a bone structure surface and/or a soft tissue envelope.

In a preferred embodiment the method further comprises the step of visualising said generated at least one 2D cephalogram together with the 3D surface model in a virtual scene.

Advantageously the method further comprises the determining of a reference frame from anatomical reference points on the person's head.

Preferably in a further step a report of the cephalometric analysis is generated.

In another embodiment the method comprises the further step of providing 2D or 3D photographs, from which a textured 3D skin surface is derived.

The analysis typically comprises the determination of linear distances between two landmarks, the distance of a landmark to a reference plane, the distance between landmarks projected on a plane, angles between landmarks or planes, proportions computed between these measurements or the distance between two points along a surface and parallel to a plane.

In yet a further embodiment the method comprises the steps of acquiring a 3D scan of the person's head, while the person is wearing a 3D splint. Also a 3D scan of casts of said person's upper and lower jaw is then preferably acquired. Next the 3D scan of said person's head, while wearing the 3D splint, and the 3D scan of casts of upper and lower jaw are fused, based on features of the 3D splint. Advantageously data from the 3D scan of the person wearing said 3D splint is subsequently used for generating the 3D surface model.

In a second object the invention relates to a method for deriving planning information for repositioning a bone fragment, comprising the steps of:

performing a cephalometric and/or anthropometric analysis as previously described, defining a set of virtual positions of the bone fragment to be repositioned, said positions being defined based on the anatomical landmarks, visualising for each of the virtual positions the result of repositioning the bone fragment together with the landmarks in the 3D surface model and on the 2D cephalograms, taking a decision on an intra-operative repositioning of the bone fragment based on the cephalometric analysis and on the visualisation.

In an advantageous embodiment the virtual positions result from a translation and/or rotation of the bone fragment.

In another object the invention relates to a device for cephalometric and/or anthropometric analysis, comprising a computing unit arranged for generating from 3D scan data a 3D surface model and a 2D cephalogram geometrically linked to the 3D surface model, visualisation means for representing the 2D cephalogram and/or the 3D surface model, and computation means for performing the analysis based on anatomical landmarks provided on the at least one 2D cephalogram and/or on the 3D surface model.

The 3D scan data are preferably CT or MRI data.

In a further object the invention relates to a 3D splint for use in a method as previously described. The 3D splint comprises a U-shaped part arranged for fitting the upper and lower dental arches and is provided with an extra-oral or intra-oral extension on the U-shaped part.

In a last object the invention relates to a program, executable on a programmable device containing instructions, which when executed, perform the method as previously described.

SHORT DESCRIPTION OF THE DRAWINGS

DETAILED DESCRIPTION OF THE INVENTION

In order to perform an adequate 3D cephalometric analysis of bone tissue and/or soft tissues, the ability to indicate the relevant points on the 3D structures alone does not suffice. Points required for adequate 3D cephalometric tracing that are not well defined on the 3D structure are available on a 2D representation and vice-versa. The present invention describes a computerised system that solves this problem.

Figure 11:
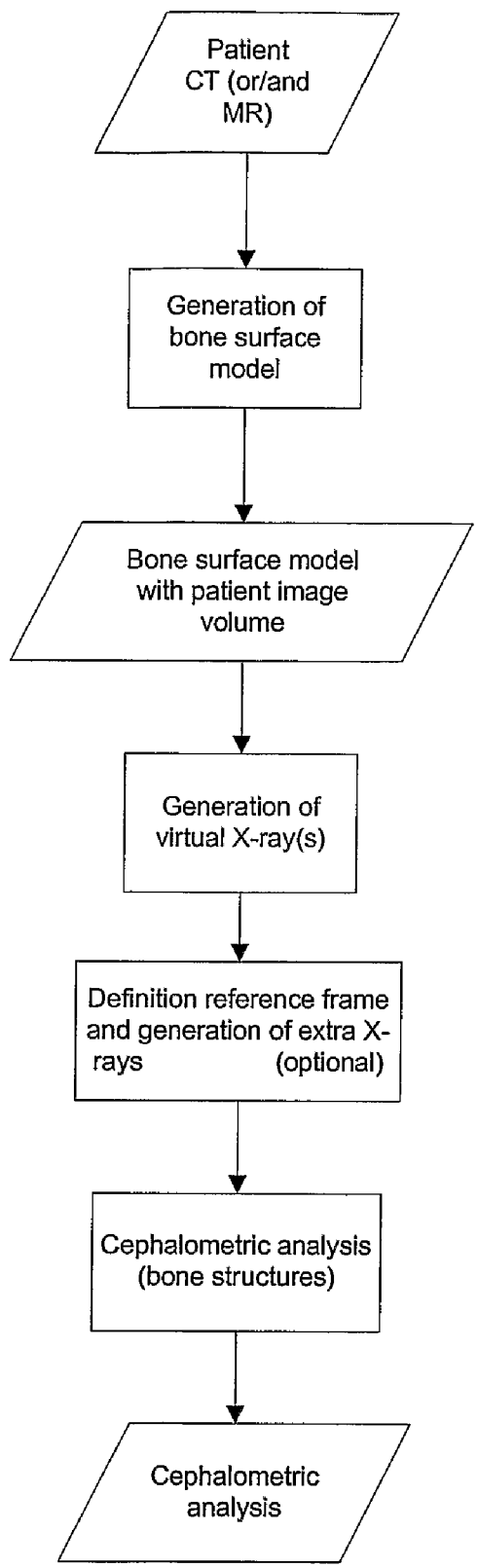
FIG. 11 to 14 represent flowcharts of various embodiments of the method according to the invention.

The present invention provides a method to redefine the framework of a 3D surface representation into an anatomically relevant framework. The anatomically relevant framework allows a clinician to perform an accurate cephalometric and/or anthropometric analysis in an intuitive manner. Moreover, a 3D surface representation comprising an anatomically relevant framework has the advantage that it allows the virtual repositioning of bone fragments in relation to anatomically relevant landmarks, making it particularly suited for the planning of surgical interventions. The flowchart shown in FIG. 11 summarises the main steps of the method according to the invention.

In medical imaging, a modality is any of the various types of equipment or probes used to acquire images of the body. Radiography, computer tomography, ultrasonography and magnetic resonance imaging are examples for modalities in the present context.

A method and device to perform a 3D cephalometric and/or anthropometric analysis is disclosed allowing a preoperative assessment of a patient's anatomy. The device comprises a computerised system, visualising image volumes (e.g. CT-image volumes) and surface models extracted from it, together with 2D projection grey-value images, i.e. virtual X-ray images geometrically linked with the CT-image and computed from it. The combined information provides a means for effectively and accurately assessing the 3D anatomy of the patient's skull and soft tissue surface. The technology fuses classical 2D cephalometric tracings with 3D bone surface visualisation. The surface model can be generated using the CT data, as described in the paper '*Marching Cubes: a High Resolution 3D Surface Construction Algorithm*' by W. E. Lorensen, H. E. Cline (ACM Computer Graphics (ACM SIGGRAPH '87 Proceedings), vol. 21, no. 4, pp. 163-169, July 1987). The virtual X-ray images (cephalograms) can be obtained as described in '*Display of surfaces from volume data*', Levoy M., IEEE Comput. Graph. Appl. 8,3 (May 1988), pp. 29-37.

Figure 12:
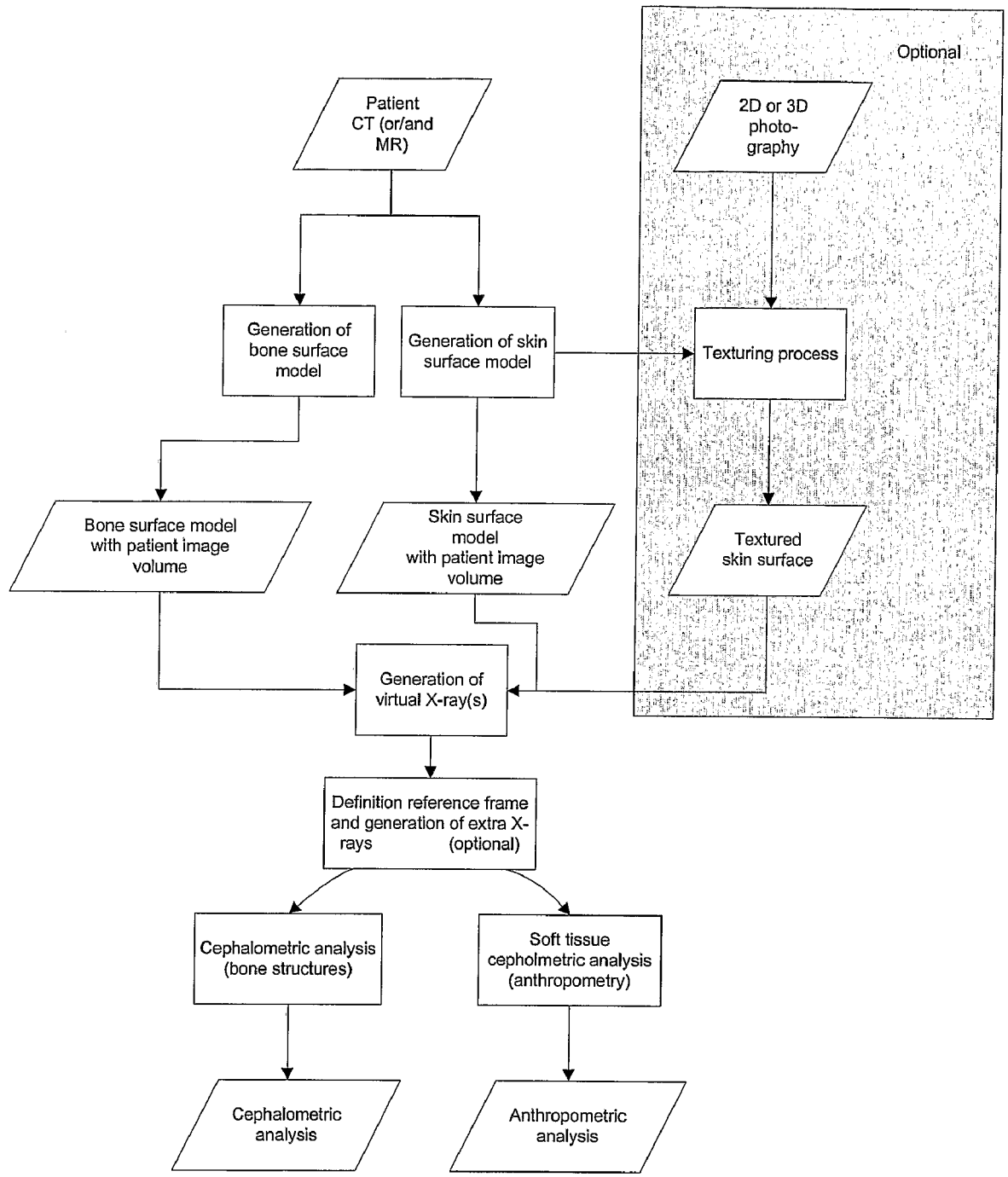

A 3D scan of the patient is the input to the system. The image volume is composed of so-called 'voxels', i.e. volume elements that each hold one value (e.g. a greyvalue). The box-shaped voxels compose a complete image volume when arranged in a three-dimensional array. Based on this image volume, a 3D surface of the bone structure and/or the soft tissue envelope is constructed. If required, it is possible to add the natural complexion (the natural tone and texture of the skin) of the face to the skin surface generated from CT-data, by adding the colour information of the face. To achieve this, a textured 3D skin surface, acquired e.g. by 3D photography or laser scanning, can be added and registered to the CT-data (see flowchart in FIG. 12). As an alternative, a series of 2D photos are acquired and by aligning the skin surface model from CT to the view of the 2D photo, the texture is transferred.

In an initial step the clinician defines or selects the type of analysis. A cephalometric analysis performs measurements at the level of the patient's skull. An anthropometric analysis performs measurements at the level of the patient's skin. The present invention allows defining various cephalometric and anthropometric analyses or even a combination of both. The type of analysis determines the anatomical landmarks that should be indicated by the clinician and the measurements that are computed.

Figure 1:
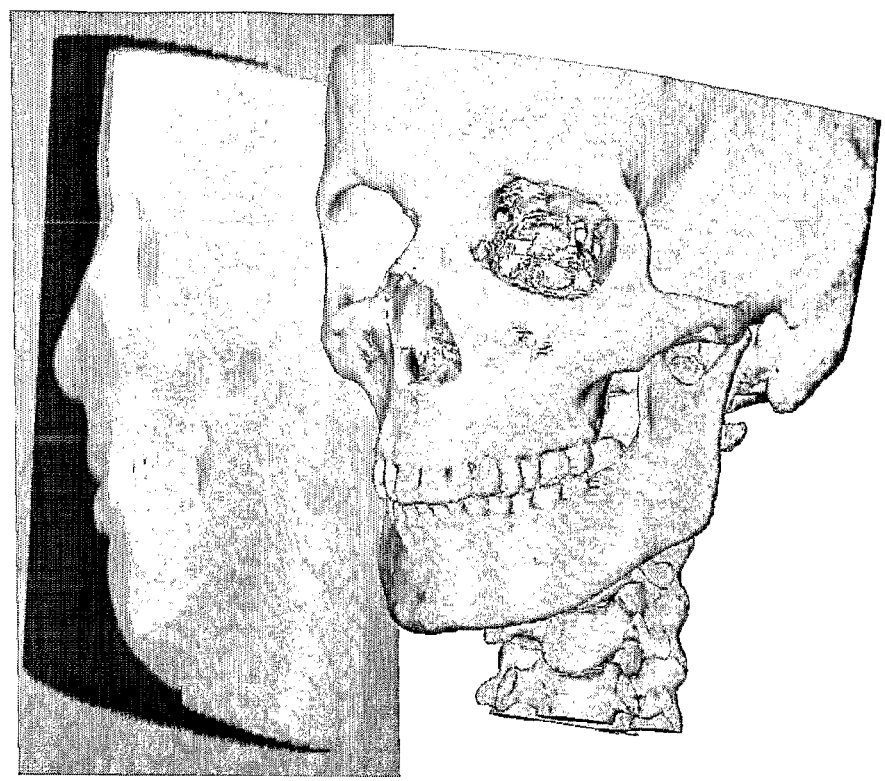
FIG. 1 represents the generation of a virtual (lateral) cephalogram.

Before indicating these landmarks the clinician has virtually positioned the patient to create a lateral cephalogram (see FIG. 1), and preferably an anatomical reference frame (FIG. 2) is installed replacing the co-ordinate system of the CT-data. Also a frontal cephalogram is optionally generated.

Figure 2:
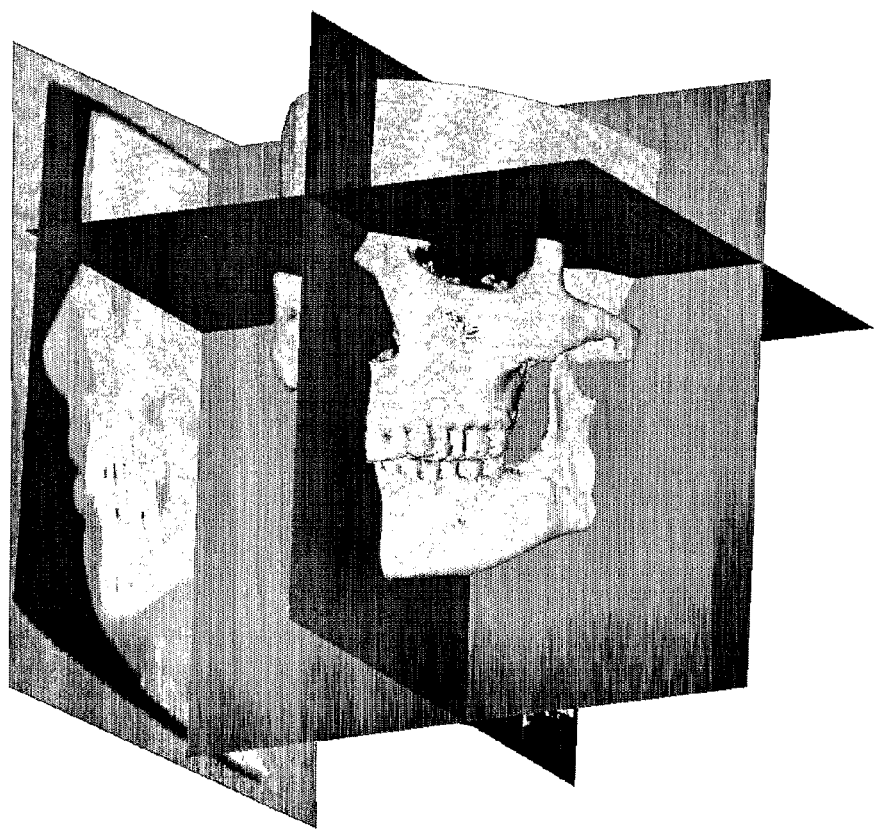
FIG. 2 represents the definition of an anatomically related reference frame.

The anatomical reference frame is a coordinate system attached to anatomical reference points. This reference frame consists of a horizontal, median and vertical plane (FIG. 2). With this reference frame, the directions up/down and left/right are linked with the anatomy of the patient. Consequently the installation of such anatomical reference frame allows an easy navigation within the virtual images.

In a particular embodiment, the system constructs such anatomical relevant reference frame after the clinician has indicated following anatomical landmarks:

1. two left/right symmetrical landmarks: e.g. the left and right fronto-zygomatic suture.
2. Nasion
3. Sella The horizontal plane is defined by the direction defined in 1, together with the direction Nasion-Sella and goes through the Sella. The median plane is perpendicular on the horizontal plane, contains the left/right direction and goes through Sella. The vertical plane is perpendicular on the median plane and horizontal plane and goes through Sella.

Another reference frame can be defined based on the skin surface alone:

1. two left/right symmetrical landmarks: e.g. the pupils,
2. with a lateral view of the head, the direction of the pupils tangent to the upper limit of the ear,
3. a soft tissue point on the facial midline, e.g. on the soft tissue Nasion point (Nasion-s).

The horizontal plane is defined by the directions defined in 1 and 2, and goes through Nasion-s. The median plane is perpendicular on the horizontal plane, and contains the direction defined by 2, and goes through Nasion-s. The vertical plane is perpendicular on the horizontal and median plane, and goes through Nasion-s.

Figure 3A:
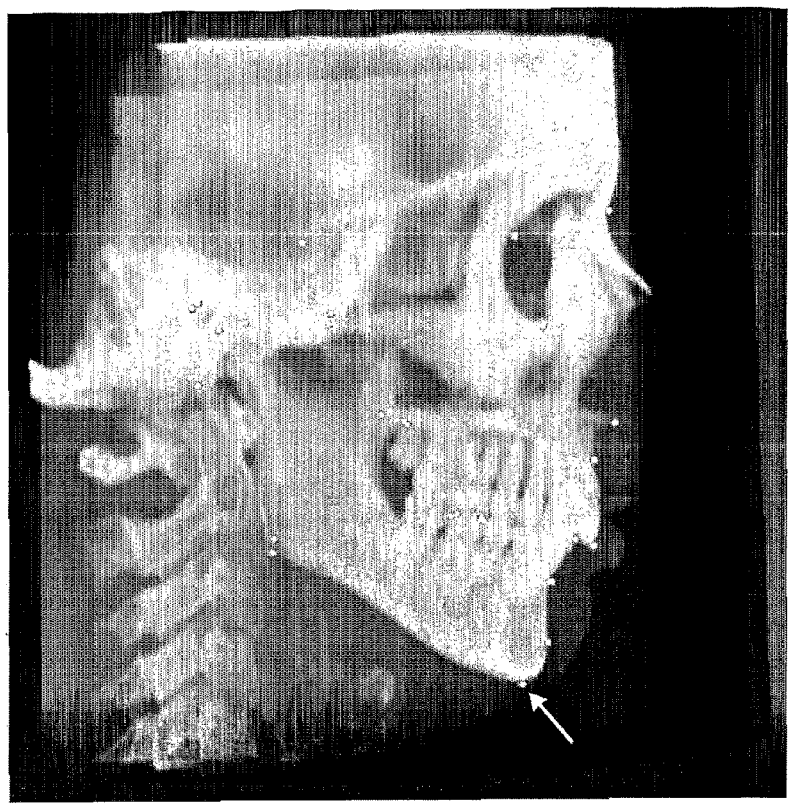
FIGS. 3A and 3B represent the definition of anatomical landmarks. Both the lateral cephalogram and 3D bone surface model are used to exactly define the points.
Figure 3B:
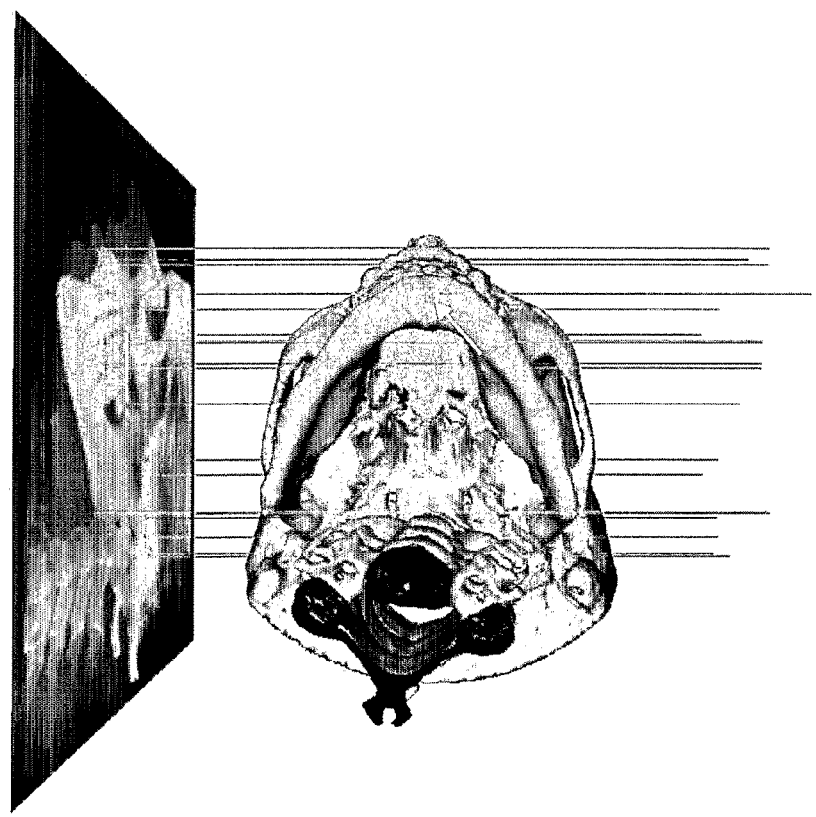

In a next step anatomical landmarks of the analysis are indicated. Landmarks are characteristic anatomical points on hard tissues or soft tissues. The landmarks can be indicated on the surface model or on the 2D cephalogram (see FIG. 3). Selected anatomical points can determine an anatomical plane, which should be considered as one of the anatomical landmarks.

Finally, the measurements (distances or angles) of the analysis are computed and preferably a report is generated. The position of the landmarks can be adjusted. Possible measurements comprise:

angles between planes (e.g. the inclination of the Frankfurter plane with the horizontal plane of the reference frame), angles between projected points, linear distances between two landmarks. This can be the actual distance between points or the distance of the points projected on the reference planes: the height, the width and the depth distances between two points, distance of a landmark to the reference planes, proportional measurements that compute the proportion between two measurements.

Figures 4, 5:
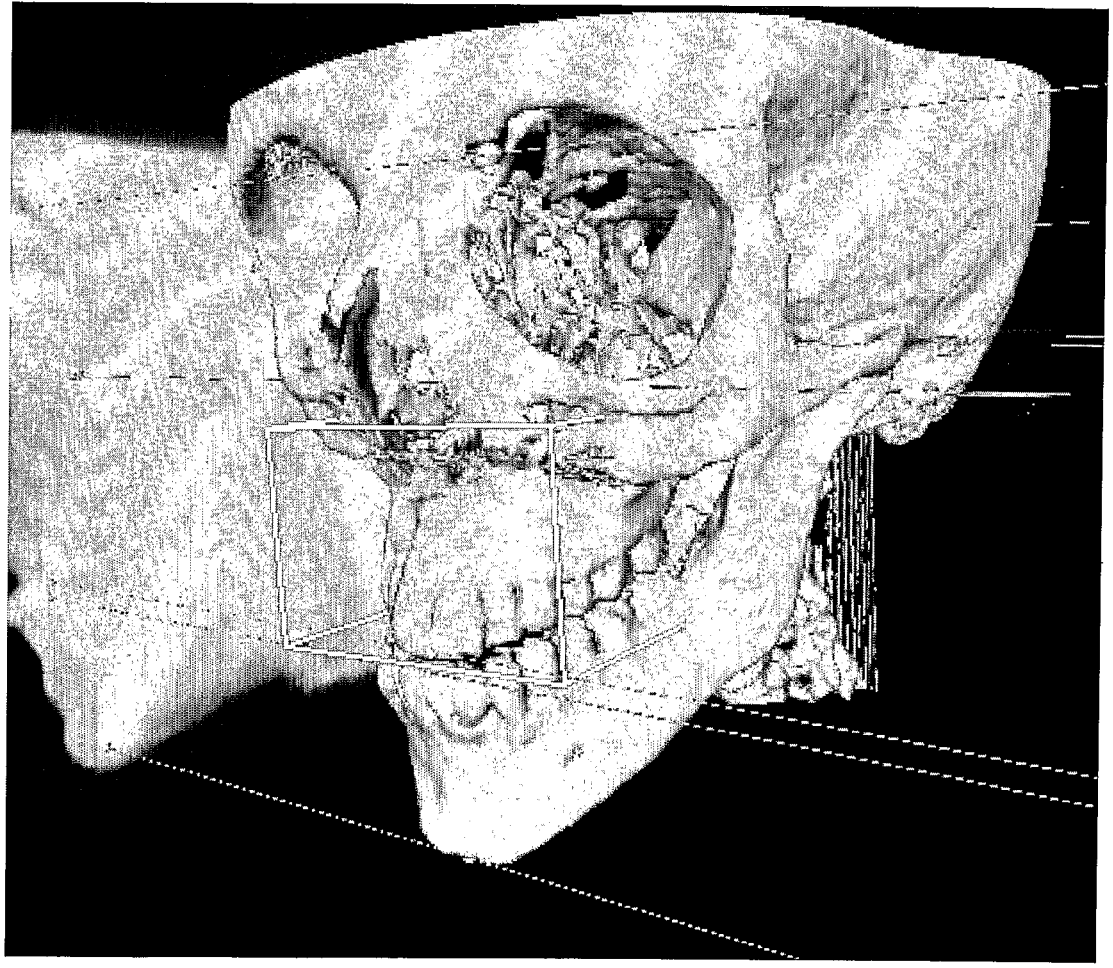
FIG. 4 represents the results of the 3D cephalometric tracing.
FIG. 5 represents the moving bone fragments being indicated during set-up of orthognatic surgery.

FIG. 4 shows an example of analysis results.

Several types of cephalometric analyses can be defined. In the set-up of a specific type of cephalometric analysis preferably following elements are defined:

whether the reference frames are used or not, and if so, which ones, a number of measurements between anatomical landmarks or anatomical planes are defined. If a landmark for a measurement is not already defined in the system, a new landmark has to be defined.

Also freely orientated extra virtual X-ray images can be generated.

In order to prepare efficiently the repositioning of bone fragments the following requirements should be achieved for an orthognatic surgery planning system:

the planning system should allow repositioning the bone fragments with respect to an anatomically defined reference frame and with respect to anatomically defined rotation/translation references, and it should visualise the results of any repositioning. Preferably, the effects of any repositioning are visualised at the level of the skeleton as well as on the level of the soft tissues.

In the prior art solutions most clinicians perform a planning using 2D cephalograms in combination with dental castings. However, as a 2D cephalogram is a projection image, 3D information is lost, while dental casts only give 3D information on a very limited area of the head and provide no information on the soft tissue.

Figure 6:
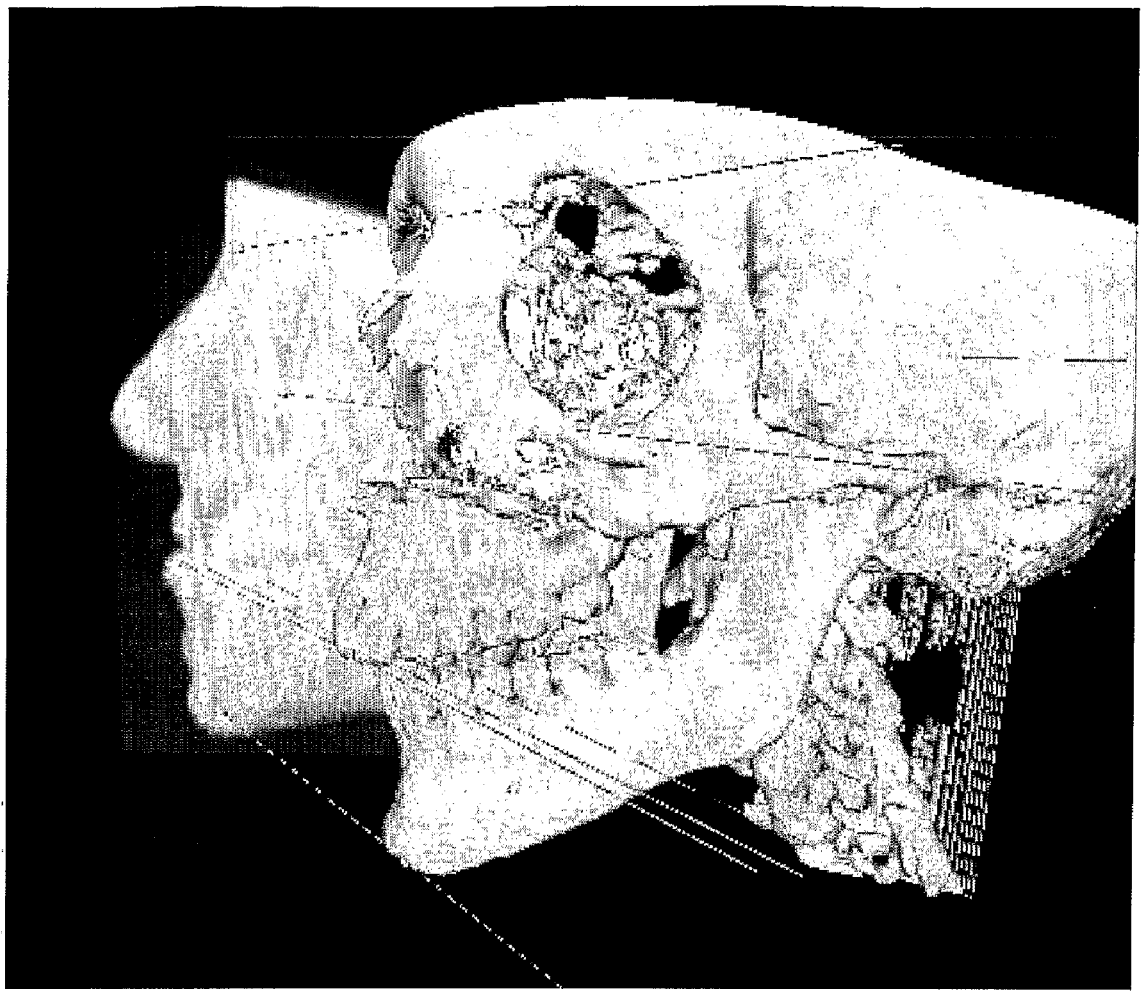
FIG. 6 represents a virtual result of orthognatic surgery.

When preparing a bone fragment repositioning, useful additional information can be obtained using the above-described 3D cephalometric analysis (FIG. 5). Using information from the cephalometric analysis, the user (typically a surgeon) can reposition bone fragments in a virtual way. As an example, FIG. 6 shows the result of a virtual maxillary repositioning. Different types of translation and rotation with respect to the landmarks can be simulated by means of the computerised planning system. For example a rotation around an axis or a translation along a direction can be defined as the intersection between two planes or as being perpendicular to a plane or it can be defined by two landmarks.

Figure 7:
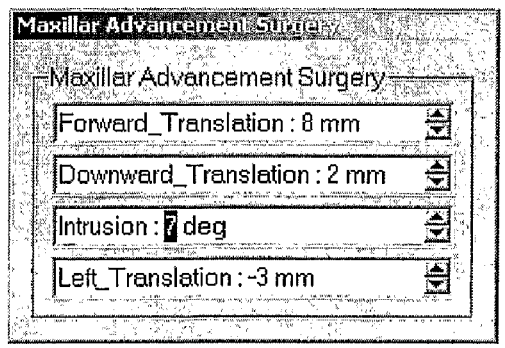
FIG. 7 represents the control window used to move the bone fragments.
Figure 8A:
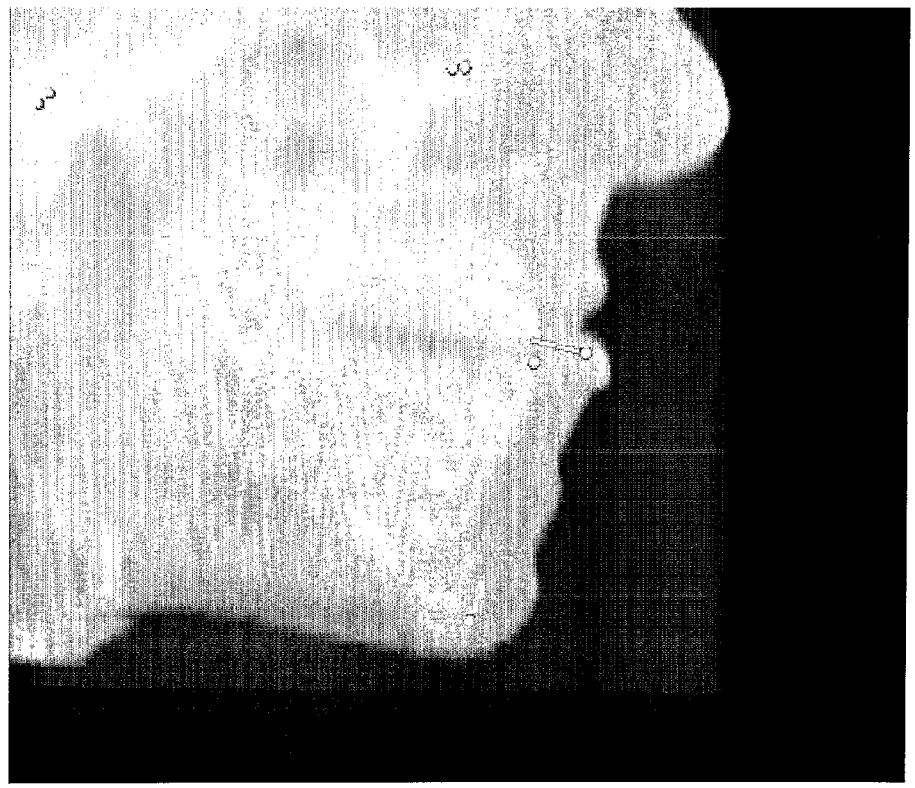
FIG. 8 represents the tracking of the movements of the landmarks on the virtual cephalograms (FIG. 8A) and on the bone surface representations (FIG. 8B).
Figure 8B:
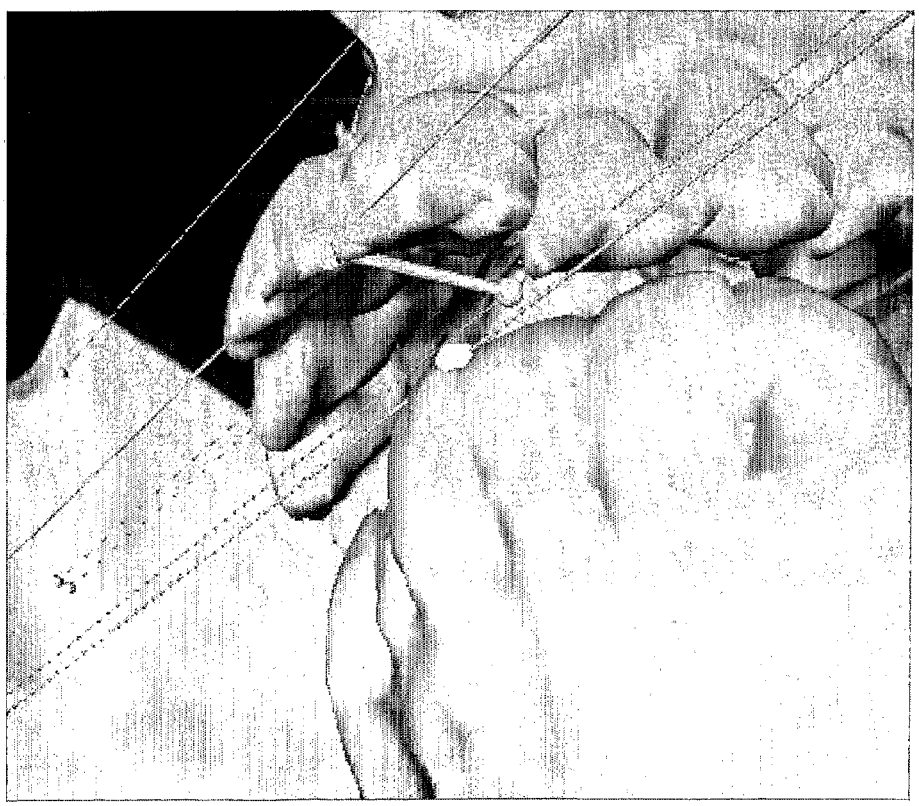

To create an easy way of working, the user can predefine in the computerised orthognatic surgery planning system various types of surgery, such as maxillary advancement, mandibular advancement, mandibular widening, etc. When he chooses a type of surgery, a user interface asking to perform several tasks is popped up. At the end, the surgeon can enter specific surgical parameters and the bone fragments are moved accordingly (FIG. 7). FIG. 7 shows parameters for the movement of the maxilla with respect to the anatomically defined reference frame. The landmarks are updated accordingly and the movement of the landmarks with respect to their original position is depicted (FIG. 8). In order to increase flexibility of the bone repositioning tools in the planning system, the user can define his set of bone movement references, adhering to his way of working and performing surgery.

Amalgam dental fillings can corrupt CT-images at the level of the teeth. This renders accurate visualisation of the occlusion very difficult. Moreover, to clearly inspect the occlusion, the details of the teeth are very important. To image the details of teeth, a very high resolution CT-scan is required, and in consequence a high X-ray exposure of the patient. However, it should be avoided to expose a patient to high X-ray doses.

Figure 9:
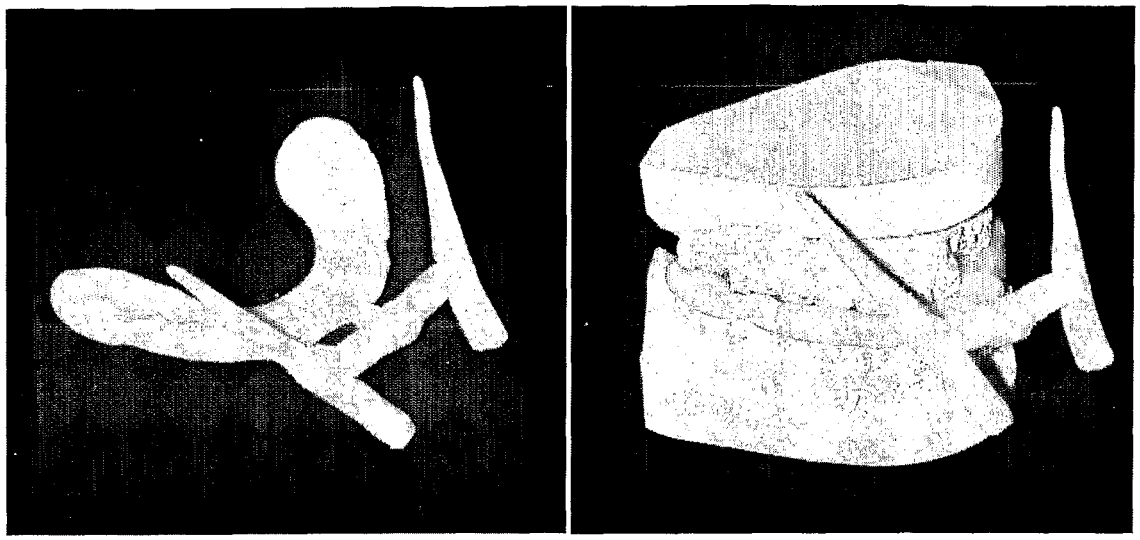
FIG. 9 represents the 3D-splint alone and in position between the plaster casts of the dentition. This 3D-splint envisages fusing by means of features of the extension.

In order to increase the level of detail at the level of the crown of the teeth, without increasing the CT radiation dose, a 3D-splint (FIG. 9) is used with a planar U-shaped geometry and fitting on both the actual upper and lower dental arches at the same time. Attached to this part, the splint has at least one extension. This extension can be either extra-oral or intraoral. The splint is produced in a non-toxic material that is almost radiolucent.

Figure 10:
FIG. 10 represents the 3D-splint alone and in position between the plaster casts of the dentition. This 3D splint envisages fusing by means of gutta-percha markers.
Figure 14:
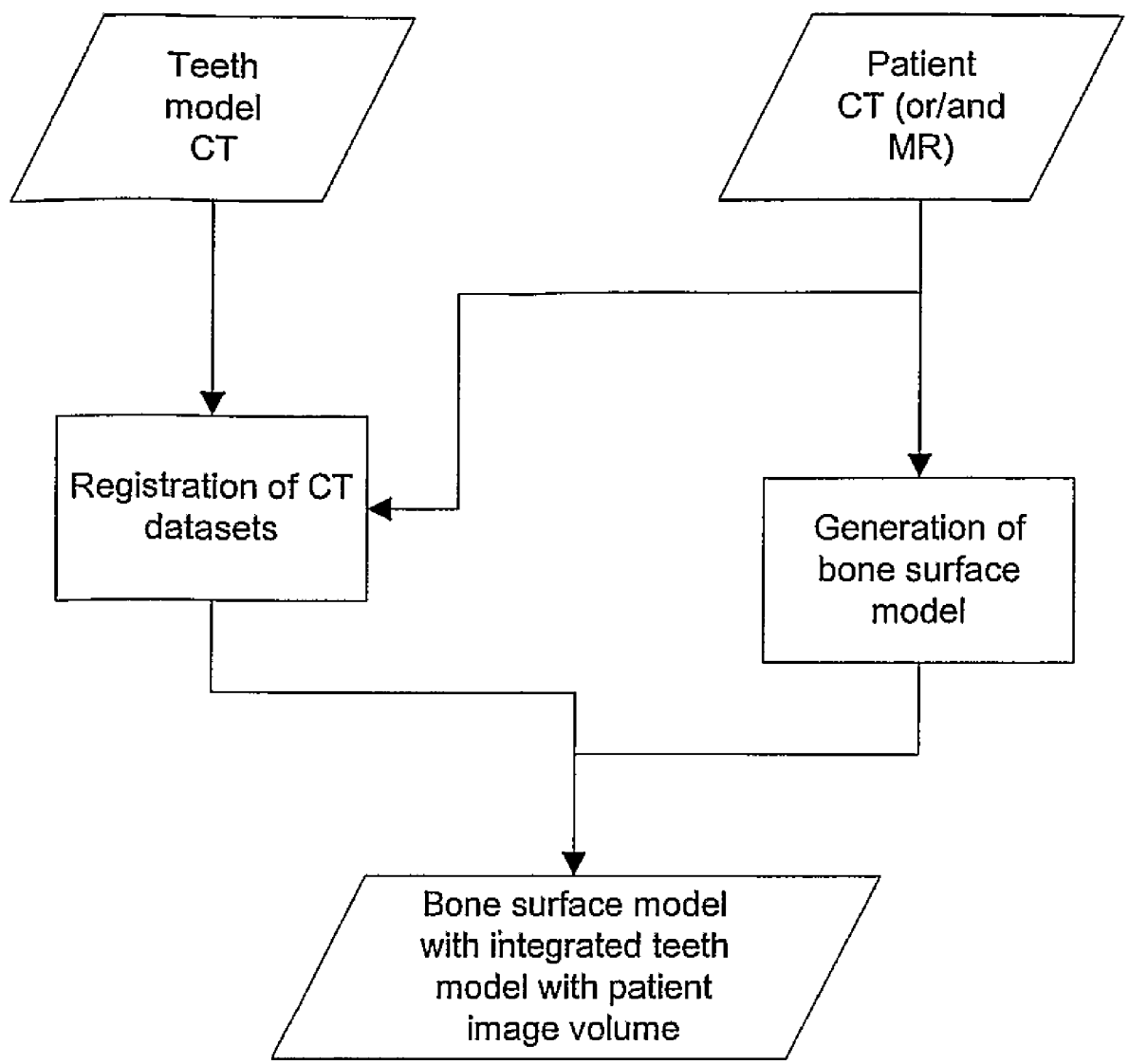
Figure 15:
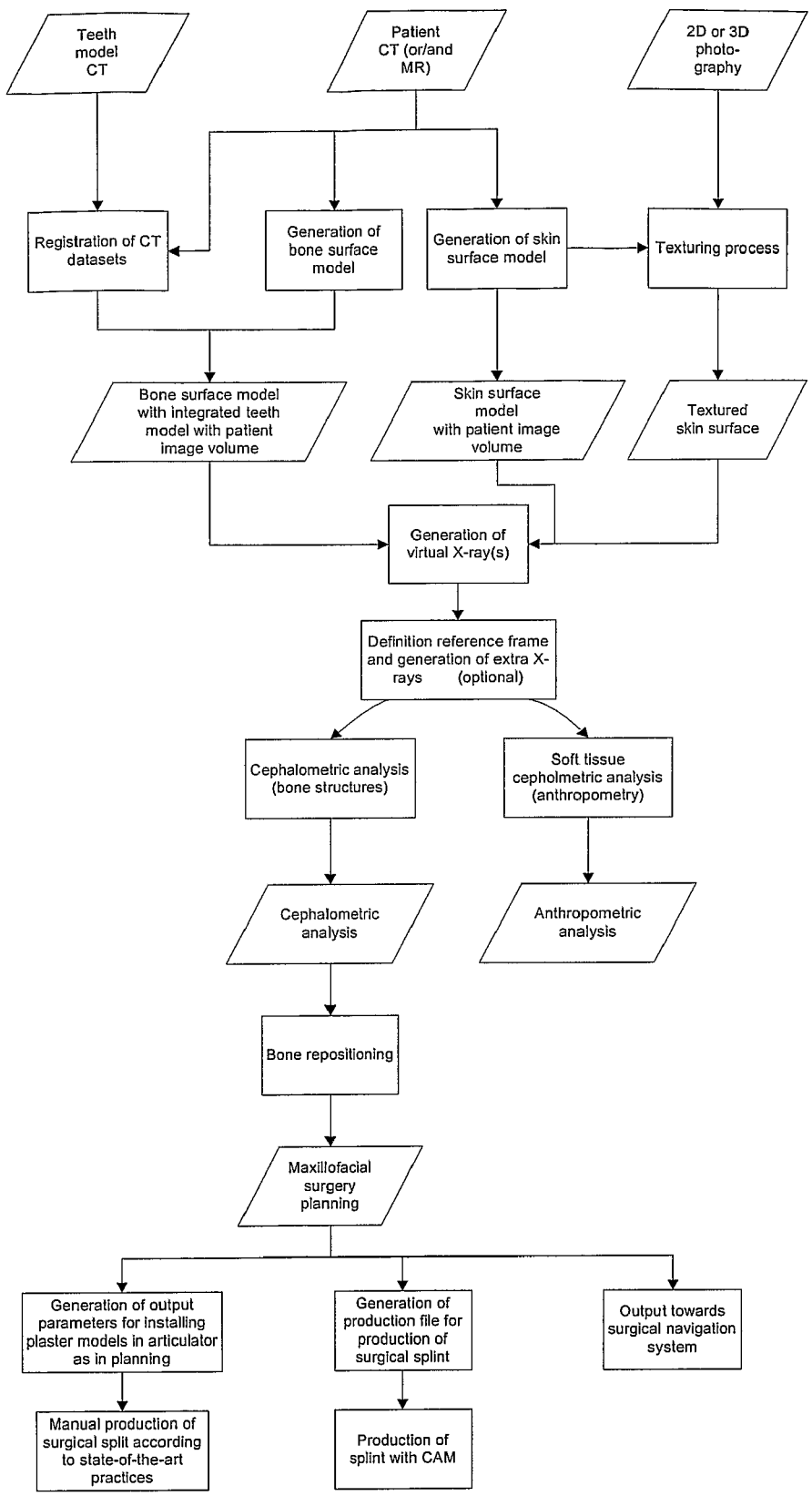
FIG. 15 represents a global summary of the flowcharts shown in FIGS. 11-14.

While wearing this splint, the patient is CT-scanned. Then, plaster casts of the patient's upper and lower jaw with the splint in between (see FIG. 9) are CT-scanned. The additional steps are also indicated in the flowchart of FIG. 14. Using image analysis techniques, the features of said extension are extracted from both the patient CT scan and the cast scan. Based on these features both data sets are fused, and the plaster casts are co-visualised with the patient CT scan. Such a feature can be the part of the surface of said extension. This allows accurate software planning at the level of crowns of teeth. Instead of employing features of the extension, one could also envisage the use of gutta-percha markers (see FIG. 10). The splint then contains at least 4 spherical gutta-percha markers with a diameter of about 1 mm. At least one marker should be positioned on the extension and not in the same plane as the U-shaped part.

After finishing the virtual planning using the 3D cephalometric reference frame with the enhanced imaging of the teeth, the plaster casts are mounted in an articulator. The planning system exports the virtual planning results to the articulator in order to move the plaster casts in the same way as in the virtual planning (see flowchart in FIG. 13). Depending on the type of articulator, this can be performed by modifying a number of characteristic parameters in accordance with the planning output, or in case of e.g. a motorised articulator, to drive that articulator. In case the model has to be split into several components, the same procedure is repeated for all components. Based on the new position of the plaster casts in the articulator, the physical surgical splints are produced.

Alternatively, the surgical splints can be digitally designed. A box-shaped or a U-shaped object is introduced in the software and the intersection volume with the plaster cast model is computed, after which the inserted object is removed. This object is then produced. Several available production methods can be applied: e.g. milling, 3D printing, stereolithography, sintering, ... Using these production methods, the splints are directly produced or otherwise a model is produced from which a splint can be derived manually by routinely used techniques.

Figure 13:
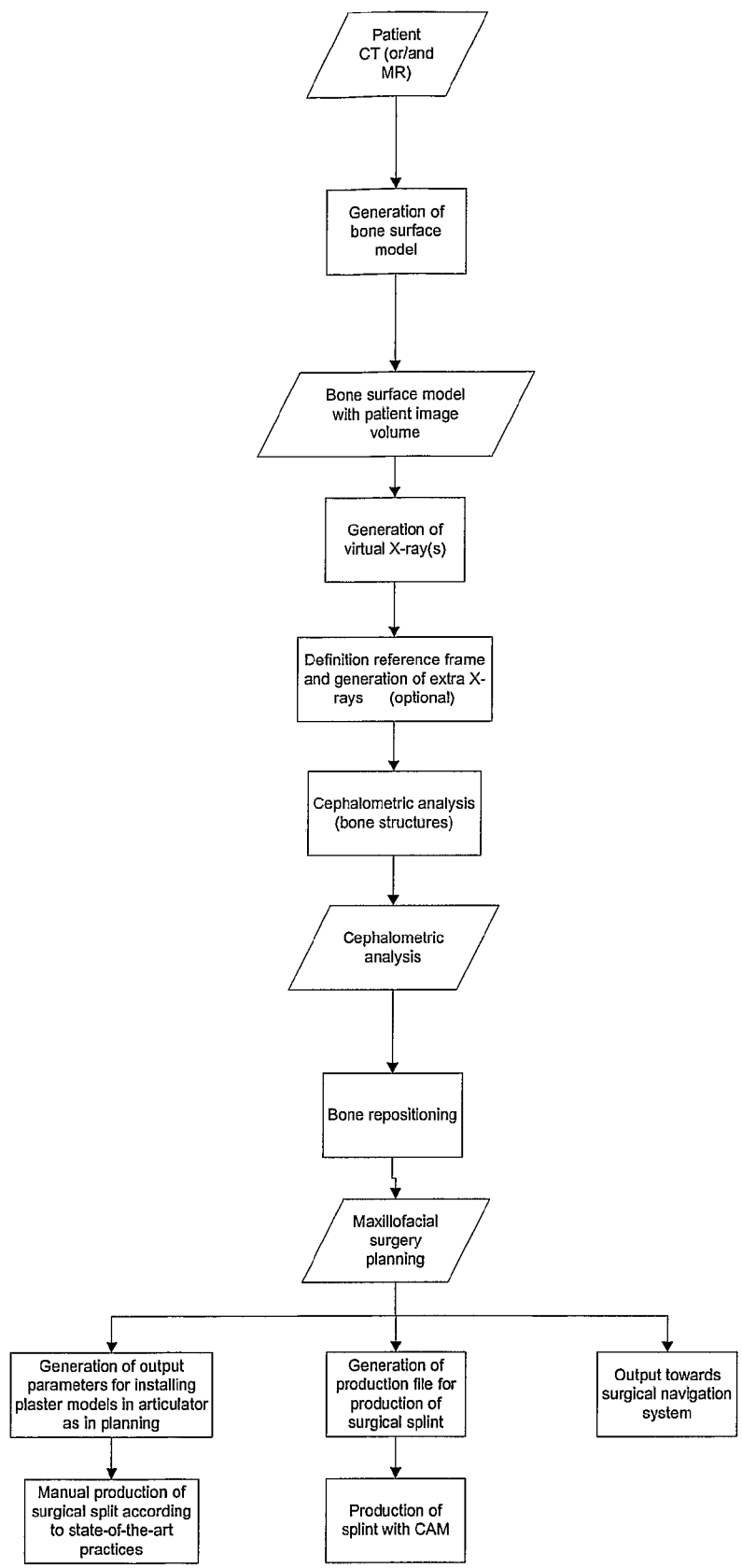

Also, the planning results of the maxillofacial surgery planning can be exported to a surgical navigation system, as indicated in the flowchart of FIG. 13.

Optionally, the surgeon can also work the other way around. The surgeon performs a (possibly partial) model surgery on the plaster casts. To check this model surgery with the remainder of the skull, the new positions of the models are CT-scanned. This scan is entered in the planning system by means of registration. Based on one or more unaltered parts of the current plaster casts and the original plaster casts, the models are registered by surface matching and the transformation matrices for the bone surface are known.

The invention claimed is:

1. A method for performing a cephalometric analysis and/or an anthropometric analysis comprising the steps of:
   acquiring a 3D scan of a person's head using a 3D medical image modality,
   generating a 3D surface model using data from said 3D scan,
   generating from said 3D scan at least one 2D cephalogram, said at least one 2D cephalogram being geometrically linked to said 3D surface model via said 3D scan,
   indicating anatomical landmarks at least on said at least one 2D cephalogram or on said 3D surface model,
   performing said cephalometric analysis and/or said anthropometric analysis using said anatomical landmarks.

2. A method for performing a cephalometric analysis and/or an anthropometric analysis as in claim 1, wherein said medical image modality is magnetic resonance imaging or computer tomography.

3. A method for performing an analysis as in claim 1, wherein said 3D surface model represents a bone structure surface and/or a soft tissue envelope.

4. A method for performing an analysis as in claim 1, further comprising the step of visualising said generated at least one 2D cephalogram together with said 3D surface model in a virtual scene.

5. A method for performing an analysis as in claim 1, further comprising the step of determining a reference frame from anatomical reference points on said person's head.

6. A method for performing an analysis as in claim 1, further comprising the step of generating a report of said cephalometric analysis.

7. A method for performing an analysis as in claim 1, further comprising the step of providing 2D or 3D photographs, from which a textured 3D skin surface is derived.

8. A Method for performing an analysis as in claim 1, wherein said analysis comprises the determination of linear distances between two landmarks or the distance of a landmark to a reference plane.

9. A method for performing an analysis as in claim 1, further comprising the steps of acquiring a 3D scan of said person's head, said person wearing a 3D splint, and a 3D scan of casts of said person's upper and lower jaw and further comprising the step of fusing, based on features of said 3D splint, said 3D scan of said person's head, said person wearing said 3D splint, and said 3D scan of casts of said person's upper and lower jaw.

10. A method for performing an analysis as in claim 9, whereby data from said 3D scan of said person wearing said 3D splint is used for generating said 3D surface model.

11. A method for deriving planning information for repositioning a bone fragment, comprising the steps of:
    performing a cephalometric analysis and/or an anthropometric analysis as in claim 1,
    defining a set of virtual positions of said bone fragment to be repositioned, said positions being defined based on said anatomical landmarks,
    visualising the result for each of said virtual positions,
    taking a decision on which one of said set of virtual positions of said bone fragment to be repositioned to add to said planning information, based on said cephalometric and/or said anthropometric analysis and on said visualisation.

12. A method for deriving planning information as in claim 11, wherein said virtual positions result from a translation and/or rotation of said bone fragment.

13. A device for cephalometric analysis and/or anthropometric analysis, comprising
    a computing unit arranged for generating from 3D scan data a 3D surface model and at least one 2D cephalogram, said 2D cephalogram being geometrically linked to said 3D surface model via said 3D scan data,
    visualisation means for representing said 2D cephalogram and/or said 3D surface model, and
    computation means for performing said analysis based on anatomical landmarks provided on said at least one 2D cephalogram and/or on said 3D surface model.

14. A device for cephalometric analysis and/or anthropometric analysis as in claim 13, wherein said 3D scan data are CT or MRI data.

15. A program on a non-transitory computer-readable medium and executable on a programmable device containing instructions, which when executed, perform the method as in claim 1.

16. A program on a non-transitory computer-readable medium and executable on a programmable device containing instructions, which when executed, perform the method as in claim 11.

* * * * *